United States Patent

[11] 3,562,420

[72] Inventor John E Thompson
Walsall, England

[21] Appl. No. 712,515

[22] Filed Mar. 12, 1968

[45] Patented Feb. 9, 1971

[73] Assignee The Post Office
London, England
a British body corporate

[32] Priority Mar. 13, 1967

[33] Great Britain

[31] 11750/1967

[54] PSEUDO RANDOM QUANTIZING SYSTEMS FOR TRANSMITTING TELEVISION SIGNALS
10 Claims, 3 Drawing Figs.

[52] U.S. Cl. ........................................................ 178/6, 325/42, 325/65

[51] Int. Cl. ........................................................ H04n 5/21, H03k 13/34

[50] Field of Search ........................................... 178/5, 6, (BUK), 6 (NS); 325/38, 38.1, 41, 42, 65; 340/347 (Red A/O), (Inquired)

[56] References Cited

UNITED STATES PATENTS

| | | | |
|---|---|---|---|
| 2,625,604 | 1/1953 | Edson | 178/6 |
| 2,803,702 | 8/1957 | Ville et al | 325/38X |
| 2,980,765 | 4/1961 | Holloway | 178/6 |
| 3,244,808 | 4/1966 | Roberts | 178/6 |
| 3,294,896 | 12/1966 | Young, Jr. | 178/5 |
| 3,350,644 | 10/1967 | McNair | 325/65X |
| 3,351,859 | 11/1967 | Groth, Jr. et al. | 325/42 |

OTHER REFERENCES

Proceedings of the IEEE; March 1967 PP320-330, Schreiber, " Picture Coding"

Proceedings of the IEEE; March 1967 PP353-355 Thompson and Sparkes, " A Psuedo Random Quantizer for Television Signals."

*Primary Examiner*—Richard Murray
*Assistant Examiner*—Benedict V Safourek
*Attorney*—Cushman, Darby & Cushman

ABSTRACT: A pseudo-random quantizing system for television signals comprises a PCM transmission channel which includes a multilevel quantizer, and also includes means for generating a multilevel dither signal produced from pseudo-random binary noise signals and arranged to give a nonwhite predominantly high frequency power spectrum which is matched to the noise sensitivity characteristic of the viewer.

PSEUDO RANDOM QUANTIZING SYSTEMS FOR TRANSMITTING TELEVISION SIGNALS

This invention relates to the pseudorandom quantizing of television signals, and is more particularly concerned with pulse code modulation or PCM transmission systems in which the luminance or brightness information is transmitted by way of a digital channel as a succession of binary code signals which represent the intensity level at successively sampled areas of the picture field.

In order to achieve satisfactory picture quality with a standard PCM transmission system which involves amplitude quantization of brightness information a signal having at least six bits per sample point is usually considered necessary in order to reduce the false intensity contours inherent in quantization to a level at which the human eye is insensitive to them, even when input compression and output expansion and other known techniques based upon the greater sensitivity of the human eye to variations of light intensity at low levels compared with similar variations at high levels are employed.

It has already been proposed by L. G. Roberts in I.R.E. Transactions on Information Theory, Vol. IT-8, Feb. 1962, pp. 145—154—Picture Coding using PseudoRandom Noise," to reduce the number of bits necessary to signal each sample point by adding a pseudorandom noise signal to the input video signal before quantizing and then subtracting the same pseudorandom noise from the analogue output signal obtained from the decoding means at the receiving end of the PCM channel. Reduction of the number of bits to 3 or 4 per sample was visualized when such a system was combined with a suitable degree of compression and expansion to match the system to the response of the human eye. To generate the required pseudorandom noise or "dither" signal Roberts proposed the use of synchronized pseudorandom number generators at the input and output ends of the transmission channel, each generator consisting of a feedback shift register clocked at the Nyquist rate, with four register outputs combined in a divider network to give a 16-level noise signal having a flat amplitude distribution.

If the four outputs of the shift register generator are combined in a resistive weighting network to give a 16 level signal of amplitude 15/16 the spacing between quantizer thresholds, I have confirmed that a display is produced with no visible contours for two bits per sample quantization. With the shift register generator cycling asynchronously the image quality has been judged subjectively to be equivalent to the original picture degraded with white Gaussian noise to 22 db. signal-to-noise ratio. With the shift register generator running in synchronism with the frame trigger the viewer has the impression of regarding the image through a dirty window, so that unless the image moves detail is obscured.

It is also already known that the quantizing noise at the receiver is least dependent on the signal when the dither signal has statistically independent samples and a uniform amplitude distribution over a quantizer level.

One object of the present invention is the provision of improved pseudorandom quantizing arrangements by which a more acceptable visual display is afforded for any given number of quantizer levels by optimizing the pseudorandom dither signal to achieve an improved subjective effect.

Another object of the present invention is to further optimize the pseudorandom dither signal to achieve an improved subjective effect.

In accordance with the present invention a pseudorandom quantizing system comprises a PCM video transmission channel including a multilevel quantizer, and dither signal generator means arranged to provide a multilevel dither signal for addition to the sampled video input signal before quantizing and for subtraction from the output signal from the multilevel quantizer, said generator means being synchronized with the sampled video input signal and including a weighting network which is supplied with pseudorandom binary noise signals which are each thereby weighted to provide a multilevel dither signal which is correlated to give a nonwhite predominantly high-frequency power spectrum at the output of the system.

Preferably, said generator means includes a shift register providing pseudorandom binary noise signals taken from adjacent stages thereof for supply to said weighting network.

In a preferred form, said generator means comprises a shift register providing pseudorandom binary noise and a square wave generator providing a binary signal of an amplitude equal to half one quantizing level and which, as regards each sampled area of the picture being transmitted, averages to zero over two successive frames.

In its simplest form the thus added binary signal is a square wave of a period corresponding to two frames but as this tends to yield severe flicker in low detail pictures it is preferable to employ a square wave of much higher frequency, for example of the order of one-half the Nyquist or shift register clock frequency, and which is suitably synchronized so that it averages to zero over two frames. By making the frequency of such square wave equal to an odd multiple of one-half the line scan frequency and alternately advancing and retarding its phase by 90° at the initiation of each frame, the possible maire interference with picture detail and dot crawl with movement of the viewer's eye or the picture image are both minimized. The additional multilevel synchronized pseudorandom noise signal may then have an amplitude equal to one-half of one quantizing level.

Frame synchronization of the dither signal greatly simplifies the problem of keeping the receiver and transmitter dither signal generators in synchronism. The high-frequency square wave disperses the "dirty window" appearance of the frame-synchronized pseudorandom noise, so that the subjective noisiness of the display is reduced by exploiting the (time) integrating property of the viewer's eye.

In order that the invention may be more readily understood a number of embodiments in accordance therewith will now be described by way of example and with reference to the accompanying drawings, in which.

Figure 1:
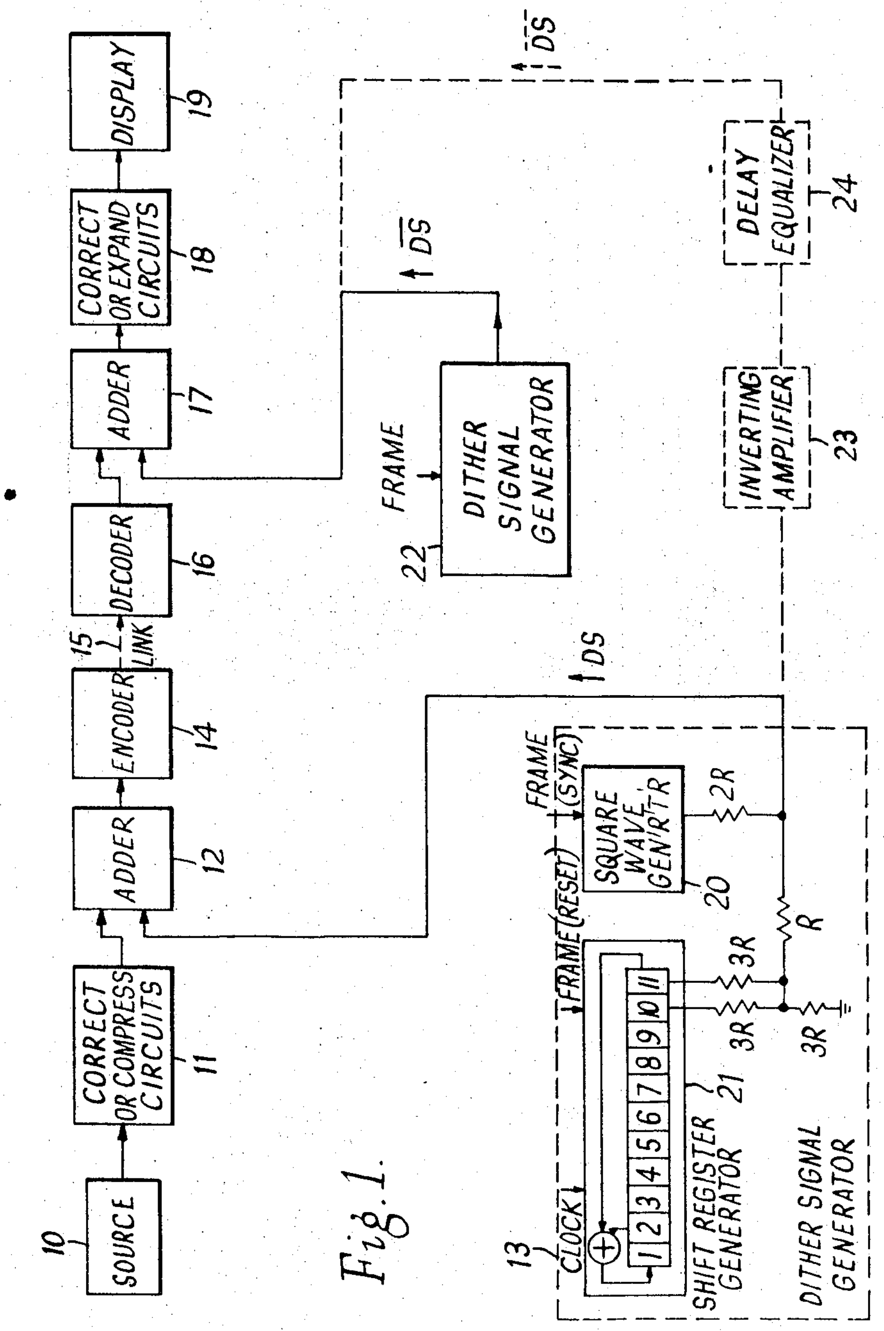
FIG. 1 is a largely block schematic circuit diagram of a pseudorandom quantizing system for television signals in accordance with the invention using a first embodiment of dither signal generator.

Referring first to FIG. 1 of the drawings, it will be seen that video signals from a source 10, such as a flying spot scanner or a TV camera operating at 405 lines, 2/1 interlaced 50 fields/second, are applied, after any desired modification, such as gamma correction or compression in known circuits shown in block form only at 11, to an adder 12. In this adder, a dither signal DS derived from a dither signal generator 13, which will be described in greater detail later, is added to the input video signals before their application to a PCM encoder 14 in the form of a 2-bit 4-level quantizer.

The binary coded signal, after transmission over the communication link 15, which may be wire or radio, is applied at the receiving end to a PCM decoder 16. The analogue form output from this decoder is then fed to a further adder 17 which is also supplied with an inverted version $\overline{DS}$ of the original dither signal DS derived in a manner which will be described later. The output adder 17 thus effectively subtracts the dither signal DS from the decoded analogue signal before its application through further modification circuitry 18, for example correction or expansion circuits complementary to the circuitry 11, to the final display means 19 such as a picture tube.

The dither signal generator 13 comprises a square wave generator 20 operating with an output signal amplitude equal to half one quantizing level and at a frequency, conveniently of the order of 3 MHz., which is an odd multiple of half the line scan frequency of the video signal from the source 10. This generator 20 is synchronized by the frame sync. pulses related to the source 10 such that, with relation to any picture sample area, its output signal level averages to zero over two frames. The generator 20 is also arranged so that its output signal phase is alternately advanced and retarded by 90° at the initiation of each field, so that Moire interference and dot crawl are further minimized. By thus averaging two frames dithered by a binary signal of amplitude equal to half one quantizing level and which inverts from frame to frame, three-bit precision can be obtained from a two-bit quantizer.

The generator 13 also includes a shift register generator 21 of a form similar to that proposed by Roberts but of a substantially reduced number of stages, for example 11 stages instead of 18. shift register generator provides synchronized pseudorandom binary noise signals of equal amplitude to the output of the square-wave generator 20. The register is clocked by a 6 MHz. master oscillator associated with the source 10 and is arranged with a feedback system as shown. It is synchronized by being reset at each frame by the frame sync. pulses. Two outputs, those from stages 10 and 11, are combined by means of a resistive network of resistances 3R, 3R and 3R to form, with the output from the square wave generator 20, the 6-level dither signal DS.

At the receiving end a similar dither signal but of inverted or complemented form $\overline{DS}$ may be generated in means 22 similar to those already described for the generator 13. Alternatively, in circumstances where the actual dither signal DS can be conveyed, this may be applied through an inverting amplifier 23 and a suitable delay equalizer 24 to the output adder 17.

With this 6-level dither signal the display has no visible contours on most pictures even though the video signal is only quantized to 24 levels, but has an amount of fine flicker subjectively equivalent to migrating white noise at a level equivalent to 28 db. signal-to-noise ratio. Since the noise does not appear stationary, image detail is not obscured, but since the shift register generator 21 is synchronized no more information than frame sync. pulses is needed to keep the transmitter and receiver noise generators in step. Also since the eye is less aware of periodicity in the pseudorandom noise field when the generator is synchronized, the length of the shift register generator can be reduced to 11 stages as mentioned above (a period of only 3 ½lines) without patterning becoming apparent.

Dithers are used extensively in control engineering, but these signals tend to be high frequency periodic waveforms, of sinusoidal or sawtooth form, rather than noiselike signals. It can be shown that a quantizer of threshold separation $a$ volts can be linearized by a dither signal which has a uniform amplitude distribution over the range $\pm\frac{1}{2}q$ volts. If the dither samples are generated at the Nyquist rate of the input signal and if these samples are independent, then quantizing noise samples are also independent, i.e., quantizing error is dispersed as additive random noise.

I have now found, however, that independent dither samples with a uniform amplitude distribution, although successfully linearizing the quantizer at the expense of additive white noise, do not correspond to the subjectively optimum condition. It is well known that the human eye has a tolerance for random noise which increases as the center frequency of the narrow-band noise increases. An illustration of this can be found in the B.B.C. Engineering Division Monograph No. 3, Oct. 1955), Part II, Fig. 16. The annoyance of a given power of white noise is about 6 db. higher than that of a similar power of noise which has a rising power spectrum to match the noise sensitivity characteristic of the viewer's eye. In order to achieve quantizing noise which has a nonwhite spectrum, it is necessary to introduce correlation between dither samples. As will hereinafter be made apparent, this can be done to the required extent without destroying the impression that the quantizing error is additive noise. Dithers of nonuniform amplitude distribution may be used because even though this means that the amplitude distribution of the quantizing noise becomes dependent on the video signal value, it is known that the human viewer is comparatively insensitive to such distributions.

According to a further important feature of the present invention quantizer equations can be derived which can be used to devise dither signals which match quantizing noise, in areas of originally constant picture brightness, to the subjective noise sensitivity characteristic.

Considering the shift register generator of FIG. 1 and as used by Roberts, this produces a sampled binary signal with a near-white power spectrum if a clocking rate equal to the video signal Nyquist rate is used. The multilevel dither signal is then generated by combining various shift register outputs in a resistive weighting network. However, this technique can be modified and adapted to generate a wide range of multilevel noise power spectra.

If as a simple example one considers a 3-level signal obtained by adding the outputs of two adjacent shift register stages, one obtains a predominantly low-frequency spectrum having a minimum level at about 3 MHz. If one obtains a 3-level signal by adding the same outputs but with one of these inverted, one obtains a predominantly high-frequency spectrum with a peak at about 3 MHz. which decreases towards the value of 6 MHz. Unfortunately, difficulties arise as a result of the nonlinearity of the quantizer. Even though the dither may be substantially high frequency, the quantizer generates intermodulation products with the predominantly low-frequency video signal so that the resulting quantizing noise may be white or even low frequency. Quantizer equations have therefore been devised to enable the effect of quantization on the dither to be calculated and to enable the quantizing noise to be related to the weighting function which generates the multilevel dither. A weighting function can then be chosen which gives a quantizing noise spectrum which is a good approximation to the noise sensitivity characteristic.

Briefly, the quantizer equations are derived as follows on the assumption that the video signal remains constant at some value between the threshold voltages. The power spectrum of quantizing noise can thus only be predicted in areas of the picture where the original brightness was constant. However, it is a subjective phenomenon that these are precisely the areas where the viewer is most sensitive to noise.

If the 6-level dither signal generator 13 shown in FIG. 1 is considered as an example, the 6-level dither signal is given by the expression $$\frac{Q}{2}\left(\frac{1}{2}x+\frac{1}{6}y+\frac{1}{6}z\right)$$

where $x$, $y$ and $z$ are the three arbitrary binary outputs (+1 or −1) for example from the square wave generator 20 and from stages 11 and 10 of the shift register generator 21 respectively, of which $x$ is the most significant. As mentioned above, Q represents the threshold separation in the quantizer. The dither amplitude is adjusted to 5/6 Q volts, rather than Q volts, in order to avoid overlapping of levels. Suppose that the video signal has a constant value which for convenience is measured with reference to that value which settles the dither midway between two thresholds, then at this value the detector output remains constant at the lower threshold voltage −Q/2. For other constant video inputs there are only five alternative binary outputs which correspond to slicing the dither signal within its six levels, and these may be expressed as logical functions of the variables $x$, $y$, and $z$.

From these expressions six quantizer equations can be derived which determine the quantizing noise spectra in terms of the binary signals $x$, $y$, and $z$. The quantizer equations thus express quantizer noise for a given video input as the sum of various/weighted binary signals $x$, $y$ 16-level and Autocorrelation techniques can be used to determine the six noise spectra. In this way, optimum arrangements of dither signal binary components and resistive networks can be determined.

In the arrangement shown in FIG. 1 the binary signal $x$ is a 3 MHz. square wave inverting at frame rate and $y$ and $z$ are outputs of a shift register generator clocked at 6 MHz. It can be shown mathematically that this arrangement whereby two adjacent outputs are taken from the shift register generator provides a subjective improvement of 5 db. which partially achieves the objective of matching the quantizing noise to the noise sensitivity characteristic.

Figures 2, 3:
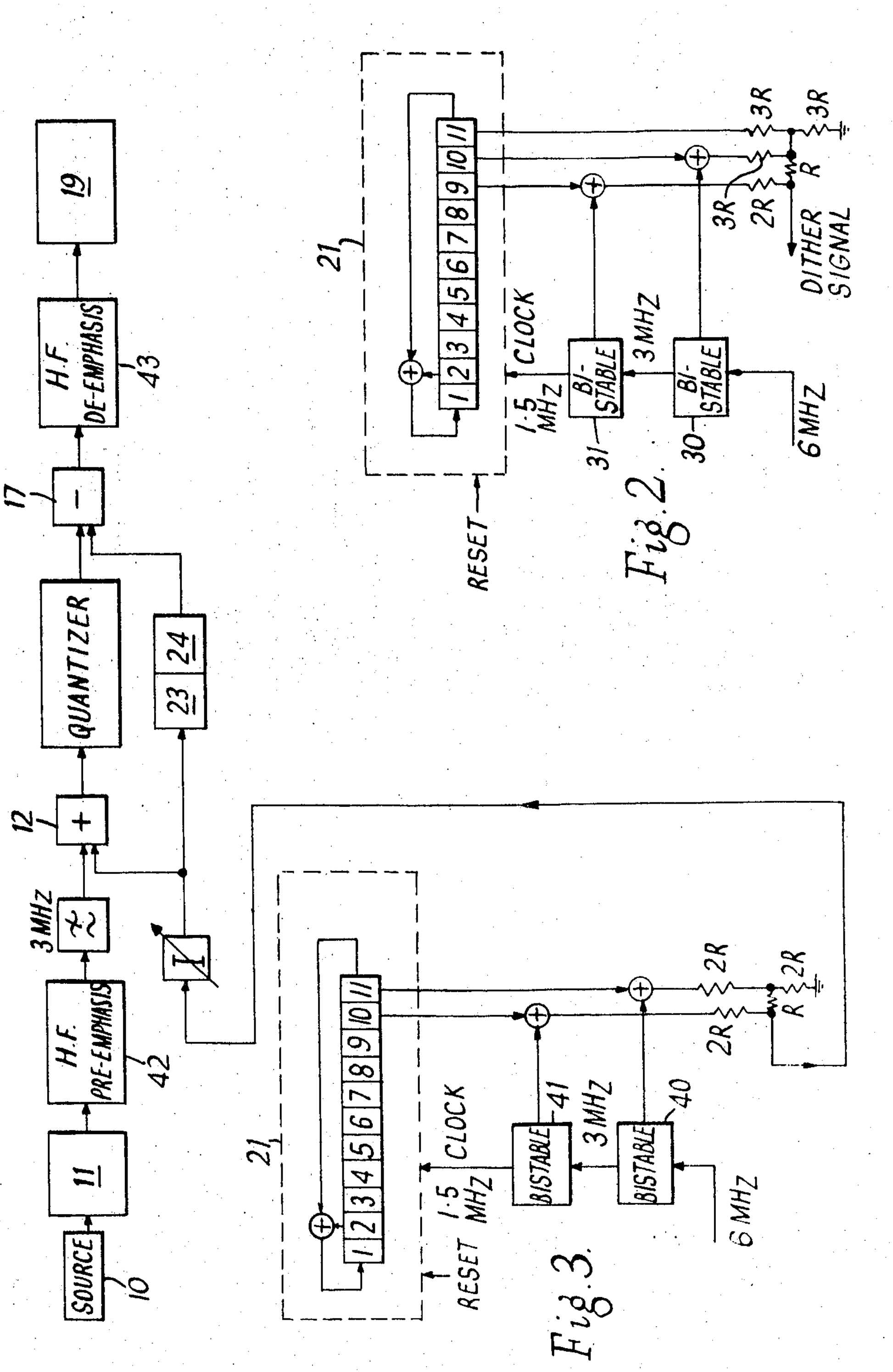
FIG. 2 is a schematic circuit diagram of a second embodiment of dither signal generator.
FIG. 3 is a block schematic diagram of a pseudorandom quantizing system using preemphasis and deemphasis filters, and using a third embodiment of dither signal generator.

FIG. 2 shows a modified form of dither signal generator, again using a shift register generator. The shaping of the noise spectrum which this arrangement achieves is slightly better than the dither signal generator shown in FIG. 1. In this arrangement the shift register generator 21 is clocked at 1.5 MHz., with the result that a low bandwidth binary sequence is obtained. Outputs are taken from stages 9, 10 and 11 of the shift register generator and the outputs from stages 10 and 9 are effectively modulated to produce a rising spectrum by 3 MHz. and 1.5 MHz. square waves respectively. The 3 MHz. and 1.5 MHz. square waves are obtained from bistable circuits 30 and 31, the first bistable circuit 30 being clocked by a 6 MHz. signal. The modulated signals from stages 9 and 10 of the generator and the third output from stage 11 are combined in a weighting circuit of resistors as shown in the drawing to again provide a 6-level dither signal. With this arrangement two of the binary dither components have rising spectra and since the product of a 3 MHz. and a 1.5 MHz. square wave produces a further 1.5 MHz. square wave, though with zero crossing points occurring between those of an output of the shift register generator, most of the cross products of these components also favour high frequencies, and contribute to a rising spectrum.

It is a further feature of the present invention that having provided a dither signal which transforms quantizing error into pseudorandom noise power concentrated at the high-frequency end of the video spectrum in accordance with the noise sensitivity characteristic, and having the means to calculate the pseudorandom quantizing noise spectrum through the quantizer equations, then conventional preemphasis and deemphasis of the video signal can be used to further reduce the quantizing noise visibility. Preemphasis and deemphasis networks are commonly used in nondigital transmission to exploit the predominantly low-frequency power spectrum of television signals to reduce the power of random noise added to the signal during transmission and is particularly effective when the added noise power is concentrated at the high-frequency end of the video spectrum. Preemphasis and deemphasis are of lesser value in digital systems which involve a peak voltage limitation since this causes clipping of the preemphasized video signal resulting in distortions of the deemphasized waveform. However, these distortions are acceptable in exchange for significant reduction of pseudorandom quantizing noise power (and visibility). According to this preferred feature of the present invention, having shaped the quantizing noise power spectrum by means of the weighting circuit, then preemphasis and deemphasis can provide a useful reduction of noise power. Furthermore, since the means to calculate the quantizing noise power spectrum is available then the deemphasis circuit frequency response may be matched to this to maximize the reduction of noise power while minimizing the clipping distortion to the video signal. The calculated quantizing noise power spectrum can be used to determine the shape of the preemphasis and deemphasis network frequency responses but the amount of emphasis is restricted by the further consideration that the quantizer equations are only valid in those regions of the picture which are of uniform brightness. The effect of high-frequency preemphasis is to amplify otherwise negligible fluctuations in these areas—such as thermal noise—and to reduce and eventually destroy the areas over which the quantizer equations are valid.

FIG. 3 shows a system of this type using preemphasis and deemphasis filters. In this system elements corresponding to those used in FIG. 1 are indicated by the same reference numerals. In this modified system an even simpler dither signal having only four levels is used so that the video signal is quantized to only 16 levels with a 4-level quantizer. However, it is a property of preemphasis and deemphasis that contours of this order can be smoothed out for most pictures in the deemphasis filter. The dither signal generator comprises a shift register generator 21 which provides relatively low-frequency binary noise which is then modulated by 1.5 MHz. and 3 MHz. square waves. Output signals are taken from stages 10 and 11 of the generator and are effectively modulated by square wave signals from bistable circuits 40 and 41 which correspond to the bistable circuits 30 and 31 of FIG. 2. A resistive weighting network is used to combine the two binary components to provide a 4-level dither which has no low-frequency power. Again, the shift register generator is synchronized with the frame trigger. The resulting two binary signals from the shift register have spectra centered on the 1.5 and 3 MHz. frequencies and provide a dither signal which confines most of the quantizing noise to the high-frequency end of the video band. As shown in FIG. 3 the system includes a high frequency preemphasis network 42 and a high-frequency deemphasis network 43. These comprise simple RC circuits of well-known form. The quantizing noise at the output end of the PCM link is reduced in the deemphasis filter 43. It has been found that an improvement over uncorrelated dither of 10 db. can be achieved using 8 db. emphasis of the high frequency video frequencies over the lower frequency video frequencies.

It should be realized that although dither signals of four and six levels only have been specifically described in the embodiments herein, dither signals of a greater number of levels, for example 16 levels, can be devised in order to cope with all types of picture. Moreover, although the dither signal generators have been described as utilizing shift register generators, the input signals to the resistive weighting networks need not necessarily be shift register generator outputs or square waves, although they must be sampled synchronously with the video sampling equipment in order to be compatible with PCM coding.

I claim:

1. A pseudorandom quantizing system for use with a sampled video input signal, said system comprising:
   - a PCM video transmission channel including a multilevel quantizer for converting an analogue input to digital form and then back again to an analogue output;
   - dither signal generator means for producing a multilevel dither signal;
   - means in advance of said quantizer for adding said dither signal to said sampled video input signal;
   - means following said quantizer for subtracting a signal equivalent to said dither signal from said analogue output of said quantizer;
   - means for synchronizing said dither generator means with said sampled video input signal;
   - said dither signal generator means comprising:
     - means for producing pseudorandom binary noise signals; and
     - a weighting network for weighting said pseudorandom binary noise signals to provide a multilevel dither signal which is autocorrelated to provide a power spectrum of increasing power density toward the higher frequency end of the frequency band of the video signal at the output of said system.

2. A pseudorandom quantizing system as in claim 1 wherein: said means for producing pseudorandom binary noise signals comprises a shift register for supplying pseudorandom binary noise signals from adjacent stages thereof to said weighting network.

3. A pseudorandom quantizing system as claimed in claim 2, wherein said shift register comprises eleven stages.

4. A pseudorandom quantizing system as in claim 1, wherein said dither signal generator means comprises:
   - a shift register for providing pseudorandom binary noise signals and
   - a square wave generator for providing a binary signal having an amplitude equal to half of one quantizing step and which, with respect to each sampled area of a picture being transmitted, averages to zero over two successive frames.

5. A pseudorandom quantizing system as in claim 4, wherein said synchronizing means comprises:

an oscillator for clocking said shift register at a predetermined frequency; and wherein said square wave generator provides square waves having a frequency of the order of half of the shift register clock frequency and synchronized to average to zero over two frames.

6. A pseudorandom quantizing system as in claim 5, wherein:

the video input signal is a television signal having a predetermined line frequency; and said frequency of said square wave is equal to an odd multiple of one-half of the line frequency and is alternately advanced and retarded in phase by 90° at the initiation of each frame.

7. A pseudorandom quantizing system as in claim 1, wherein said generator means comprises:

a shift register;

means for clocking said shift register at a first frequency to generate relatively low frequency pseudorandom binary noise; and modulating means for modulating said relatively low-frequency noise with signals at said first frequency and with signals at a second frequency to provide instant signals for said weighting network.

8. A pseudorandom quantizing system as in claim 7, wherein said first and second frequencies are 1.5 MHz. and 3 MHz. respectively.

9. A pseudorandom quantizing system as claimed in claim 7, including:

output junction means in three stages of said shift register operatively connected to said weighting network;

the signal on one of said output junction means being modulated at said first frequency;

the signal on the second of said output junction means being modulated at said second frequency; and the signal on the third of said output junction means being connected directly to said weighting network.

10. A pseudorandom quantizing system as in claim 1, including:

a preemphasis filter network connected at an input to said means for adding a dither signal; and a deemphasis filter network connected at an output of said means for subtracting a signal equivalent to said dither signal from the output of said quantizer.

UNITED STATES PATENT OFFICE

CERTIFICATE OF CORRECTION

Patent No. 3,562,420 Dated February 9, 1971

Inventor(s) John E. Thompson

It is certified that error appears in the above-identified patent and that said Letters Patent are hereby corrected as shown below:

Column 2, line 19, change "maire" to --Moire'--.

Column 3, line 11, before "shift", insert --this--.

Column 4, lines 43 ff, in the equation, change "X" to --x·

Column 4, line 68, change "16-level and" to --and z.--.

Signed and sealed this 17th day of August 1971.

(SEAL)
Attest:

EDWARD M.FLETCHER,JR.
Attesting Officer

WILLIAM E. SCHUYLER, JR.
Commissioner of Patents

FORM PO-1050 (10-69)

USCOMM-DC 6037

★ U.S. GOVERNMENT PRINTING OFFICE